April 5, 1960     F. P. FEHN, SR     2,931,928
TORQUE TRANSMITTING MECHANISM

Filed Aug. 30, 1956     5 Sheets-Sheet 1

INVENTOR.
FRANK P. FEHN, SR.

BY Williams & Tilberry
ATTORNEYS

INVENTOR.
FRANK P. FEHN, SR.
ATTORNEYS

*INVENTOR.*
FRANK P. FEHN, Sr
BY Williams & Tilbury
ATTORNEYS

April 5, 1960   F. P. FEHN, SR   2,931,928
TORQUE TRANSMITTING MECHANISM
Filed Aug. 30, 1956                                    5 Sheets-Sheet 4

*INVENTOR.*
FRANK P. FEHN, SR.
BY
ATTORNEYS

United States Patent Office 2,931,928
Patented Apr. 5, 1960

2,931,928

TORQUE TRANSMITTING MECHANISM

Frank P. Fehn, Sr., Canton, Ohio, assignor to E. W. Bliss Company, Canton, Ohio, a corporation of Delaware Application August 30, 1956, Serial No. 607,024

28 Claims. (Cl. 310—95)

This invention relates to improvements in couplings, torque transmitters, and prime movers, and in particular to apparatus of the like which utilizes high moment of inertia members to function as energy accumulators whereby to accumulate and/or store energy for subsequent conversion to do useful work.

*Introduction*

As an illustrative example, the invention may be embodied in an apparatus having a high moment of inertia member such as a flywheel energy storing means associated with other apparatus to make the device self energizing, and adapted to selectively transmit torque and counter-torque to shafts and the like with which the apparatus is associated.

High moment of inertia members such as energy accumulating masses are normally utilized to transmit stored energy into work producing torque of various kinds. A flywheel is a good example of an energy accumulating mass which has been adapted to industrial purposes for the operation of many types of present day machinery. It is common practice to idly mount a flywheel mass on a crankshaft, driveshaft, or the like, and rotate it thereabout by means of a prime mover such as a small electric motor which is belt-connected to the other periphery of the flywheel. Conventional devices for utilizing the energy of the flywheel include clutch means normally incorporated between the flywheel and the load. In addition, a mechanical brake is usually adapted to coact with the clutch so as to engage and brake the load when the clutch is disengaged to disconnect the flywheel from the load.

Because flywheels normally are driven at substantially uniform velocity, and inasmuch as it is sometimes necessary to operate machinery at various speeds, speed reduction gear systems have also been incorporated separately or in combination with flywheel clutches. It is also important in some industrial applications of machinery that the equipment be protected against sudden and/or unexpected overloads. To this end, special overload protecting devices may be incorporated into the power train of the machinery, such as overload clutches and the like, which will disengage under a predetermined critical load to release the wheel energy torque input. The refinements of the speed reduction gear systems referred to hereinabove may also include reversing gear systems to operate the apparatus in both the forward and reverse directions. Further control features of the speed and direction control means may also include devices to provide more instant response to change of direction and velocity.

In summation, therefore, some of the more important accessories adapted to utilize energy accumulating and/or storing devices which are employed separately or in combination to operate many types of industrial machinery include: a prime mover, a clutch, a brake, a speed-change and/or reverse drive mechanism, overload-protection devices, and control means to coordinate the various accessories associated with the apparatus.

In view of the foregoing, it is a general object of the present invention to provide an improved and novel prime mover and torque-transmitting mechanism which will perform all of the functions of the mechanisms set forth in summation hereinabove, and which will provide these functions with improved performance.

It is a primary and important object of the invention to provide novel means to energize the above-mentioned torque-transmitting mechanism, and/or prime mover, wherein said mechanism is able to function in a superior manner to perform the tasks of the above recited accessories, without requiring additional mechanisms.

It is also an object of the invention to provide a device of the above character wherein the requirement for barking to the frame of the apparatus is reduced to an absolute minimum.

Another object of the invention is to provide a self-contained mechanism developing its own prime-moving torque and providing a substantial energy accumulating and storing member from which output torques may be transiently taken.

It is a specific object of the invention to achieve the above objects with the structure utilizing, to the greatest extent possible, components which are readily and commercially available.

It is yet another object of the invention to provide a self-energizing flywheel, wherein its driving means is interposed between the flywheel and the load.

Further objects of the invention include the provision of an energy accumulating flywheel-type device which functions as a clutch and brake in addition to providing a source of output torque, and yet which requires no more space than a conventional flywheel; the provision of torque-transmitting means which may be controlled to function as an overload protection device; the provision of a flywheel-type torque-transmitting means in which the output is variable in speed and/or direction irrespective of the rotation of the flywheel; the provision of a novel device adapted to perform the functions of a motor, flywheel, clutch, brake, reverse gear, and overload-protection mechanism in a superior manner and with a minimum of wear and maintenance; the provision of a novel combination motor, flywheel, clutch, brake, and overload protection device which is amenable to more precise control, which is relatively inexpensive to manufacture, and which has a minimum of mechanical wearing contact between parts.

Other objects and various features of novelty and invention will be pointed out or will occur to those skilled in the art in the reading of the following specification in conjunction with the accompanying drawings. In said drawings, which show for illustrative purposes only, preferred forms of the invention:

General organization and function

Figure 1:
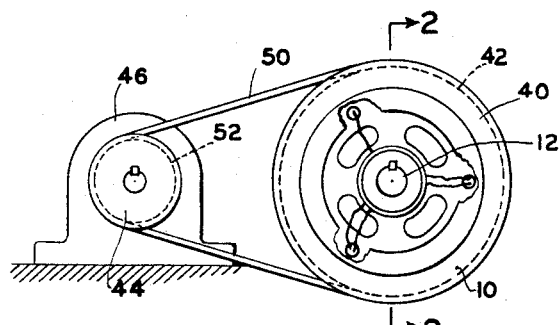
Figure 1 is an elevational view of a preferred embodiment of the invention showing a conventional belt-driving connection to an electric motor prime mover employed in certain applications of the invention.

Briefly stated, the invention contemplates the employment of a pair of members rotatable about a common axis, each member of which is mounted for rotation on a non-rotatable member which may be any suitable support or the frame of a machine. In the forms to be described hereinbelow, one of the rotatable members, which may be termed the input member, of relatively great moment of inertia, constitutes an energy accumulating or storing mass in the form of a flywheel. The other rotatable member may be termed the output member, and is adapted to have considerably less moment of inertia than the input member. The output member is adapted to take energy in the form of torque from the input member and transmit it to other parts of the machinery to do useful work.

In general, there are two types of torques which can be transmitted or produced between the input and output members. One of these is a repulsion torque in which the output torque is reacted against the input member and tends to create and increase the differential speed of the two members. The other type may be termed attraction torque and is opposite in sense to the motoring torque, i.e., it tends to reduce the differential speed of the input and output members and lock them together for concurrent rotation. The repulsion torque may be called motoring because it is analogous to the operation of an electric motor, while the attraction torque may be called clutching because it is analogous to the function of a clutch.

Accordingly, motoring and clutching elements are carried on one of the members, and electromagnetic elements are carried on the other member to co-act with the electric motoring and clutching elements carried on the one member. Means are provided for holding the output member against rotation in at least one direction, so that, upon excitation of the motor elements, the input member may be driven relative to the non-rotatable member and frame so as to develop angular momentum, or may be brought to rest.

In one mode of operation, output torques are developed by transiently de-energizing the motoring elements and simultaneously actuating the clutching elements. This function may be referred to as "positive" or "attraction" torque transmission, and is basically in the same direction (or sense) as the momentum of the input member. After delivery of the desired transient positive or attraction torque to the load, the clutching elements are de-energized and the motoring elements are re-energized so that the input member may be re-accelerated at the same time as the output member is decelerated. The holding means is effective to retain the output member against rotation once a counter-rotational motoring action has brought the output member substantially to rest. Thus re-energization of the motoring element serves both to reduce the angular velocity of the output member to such a point that mechanical brake holding means may be effective to bring the output member to rest, and at the same time to reaccelerate the input member to regain energy transmitted to the output member. Otherwise stated, the means for reducing the angular velocity of the output member is by reference to the input member rather than to the frame, wherein the energy required to brake or reduce the angular velocity of the output member is utilized to accelerate the input member and thus is not entirely wasted or dissipated in heat which performs no useful work.

In another mode of operation, which may be termed "negative" or "repulsion" torque transmission, output torque is basically in the direction (or sense) opposite to that of the input member momentum. The normal momentum of the input member is based on a motor-element speed representing less than "full" or maximum motor speed. Negative or repulsion output torques are developed by transiently further energizing the motor elements while the clutch elements are not actuated and the holding or brake means are released. After delivery of the desired transient "negative" or repulsion torque to the load, the motoring elements are de-energized and the clutching elements are actuated so that the input member may be decelerated at the same time that the output member is also decelerated. The holding means may again be effective to retain the output member against rotation once clutch action has brought the output member substantially to a standstill.

The input and output members may be provided with separate co-acting motoring and clutching elements or, in the alternative, the input member may be provided with separate motor and clutch elements which selectively co-act with a common element on the output member. In other embodiments of the invention the input member may have a single winding which is adapted to function selectively as either a motoring element or a clutching element, and the output member may be a single element adapted to co-act with the input windings whether functioning as a motoring element or a clutching element. Yet another combination would comprise a single element on the input member which would be adapted to function as either a motoring or a clutching element selectively, and the output member would be provided with both motoring and clutching elements which would selectively function to co-act with the sole element on the input member depending on whether it was energized to function as a motor or as a clutch.

Mechanical embodiments

Figure 2:
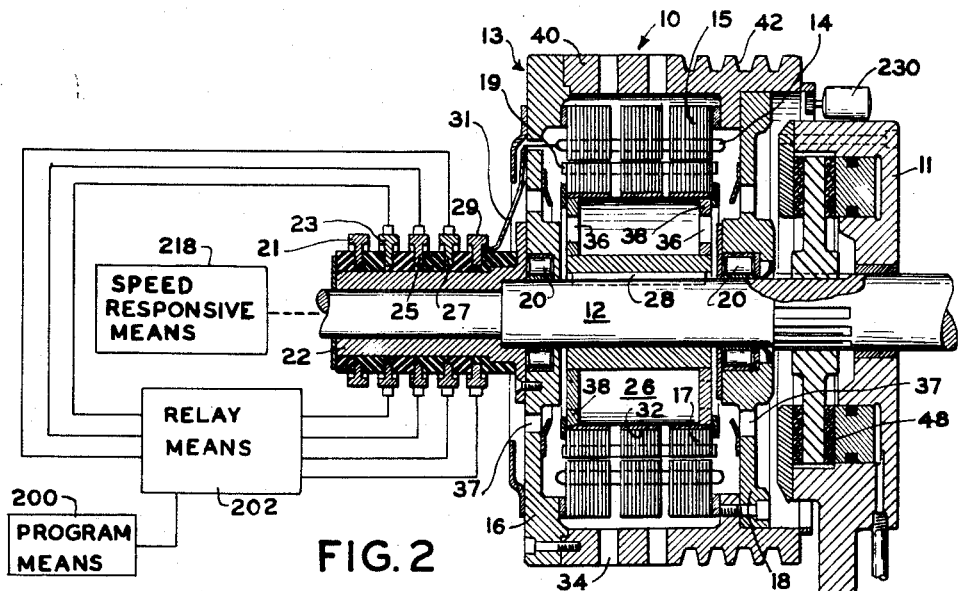
Figure 2 is an enlarged sectional elevation taken substantially along line 2-2 of Figure 1, to illustrate the internal structure of the device, and to show schematically slip rings for supplying current thereto.

Referring now to Figures 1 and 2 of the drawings, a preferred embodiment of the invention is shown to comprise a pair of rotatable members 10 and 26 adapted to rotate relative to each other, and both being rotatable relative to the frame 11. In the form shown, the output member 26 is keyed to the shaft 12 from which output torques are taken. The input member 10 is fitted with bearings 20—20 to rotate on the shaft 12.

As indicated generally above, co-acting electromagnetic elements are carried by each of the rotatable members 10 and 26, and in the form shown these elements comprise field windings 14 and laminations 15 carried by the input member 10, and armature laminations 17 and windings 19 carried by the output member 26. The input and output member windings 14 and 19 may be of any variety to develop rotational torque between the two members 10 and 26, and electrical connections may be made by way of slip rings and/or commutator rings (not shown) as is common practice. By this is meant that the elements may constitute parts of an otherwise conventional D.-C. or A.-C. motor; however, in the drawings, the employment of induction motor construction is indicated schematically, three phase A.-C. or D.-C. excitation being applied to the electrical elements of the input member. The motor element on the output member 26 is shown as being of the squirrel cage variety, but so-called wound rotor construction may also be used in certain applications. Since the input member 10 is to constitute the energy accumulating and storing mass from which rotational energy is to be transiently extracted, member 10 is formed so as to have a very substantial moment of inertia about the axis of rotation as, for example, by provision of a large annular mass 13.

To complete the general organization of the embodiment of the apparatus shown in Figures 1 and 2, mechanical brake means 48 are shown co-acting between the output member 26 and the frame 11, and it is convenient to utilize a friction brake of the type which is in common use and readily available on the market.

Means for journaling the input member 10 on the shaft 12 comprises a pair of side members 16 and 18 secured to opposite sides of this member and mounted on *the* aforesaid anti-friction bearings 20 carried on a shaft 12. An extension of the right end of the shaft 12 (Figure 2) is intended to be suitably connected to any work performing device. The left end of the shaft is provided with a sleeve 22 to carry a plurality of electric current collector rings 21, 23, 25, 27 and 29 thereabout. Although five collector rings are shown in Figure 2, any required number may be employed to supply the electrical requirements for the device, as will be explained more fully hereinafter.

An output member 26 is integrally secured to the shaft 12 by key means 28 or the like to rotate concentrically within the input member 10. The output member 26 is provided with electrical self-induction windings 19, as aforesaid, about its outer periphery 32, the windings on this member being preferably of the squirrel cage variety. Air passages 34 are suitably provided in the outer periphery 40 of the input member 10, and air holes 36 and 37 are provided in the side walls 38, 16 and 18 respectively as is common practice. Although, as set forth hereinabove, the outer member 10 is adapted to be the driving or input member and the inner member 26 is seen to be the output or driven member, it will be understood that the input and output relationship and these members may be reversed without departing from the scope of the invention. It will be also understood that inner and outer concentric relationship between the input and output members is not an absolute requirement for the functioning of the invention, although it is a preferred embodiment. For instance, the embodiment of the invention shown in Figure 6 includes input and ouput members which are adapted to rotate in parallel planes, as will be explained more fully hereinbelow. Conventional brake means may also be conveniently located on a shaft 12 to finally stop the rotation of the output member during certain modes of operation of the invention, although in other modes of operation of the invention use may be made of one-way acting brakes in lieu of the two-way positively acting brake. An embodiment of the invention utilizing a one-way acting brake is shown in Figure 7, and will be discussed more fully hereinafter.

Where the period between operations is short, the energy restoring motoring action between the input member 10 and the output member 26 may not last for a period of time sufficient to restore all flywheel energy losses. The balance of the energy losses consumed during the work producing portion of the cycle must, therefore, be replaced by outside means, such as a small electric motor 46, belt connected to the input member 10 by means of V-belts 50. The V-belts 50 will ride in conventional V-belt grooves 42 and 52 provided in the outer pheriphery 40 of the input member 10 and the motor pulley 44. Because of the motoring action of the output member 26 and the input member 10, the motor 46 may be considerably smaller than that which would normally be required to power a conventional flywheel driven apparatus.

Figure 3:
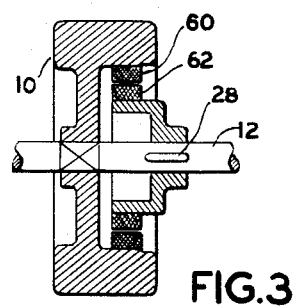
Figures 3, 4, 5 and 6 are embodiments of the invention similar to Figure 2 showing various combinations of input and output members and appropriate wiring associated therewith.

The device of Figures 1 and 2 shows but one arrangement of the input and output members 10 and 26. Other arrangements within the scope of the invention as contemplated will occur to those skilled in the art based on the teaching of this invention. For instance, as shown in Figure 3 it is possible to secure induction windings 60 to the inner periphery of the input member 10 and excitable windings 62 to the outer periphery of the output member 26 without changing the theory of operation of the invention as described hereinabove.

Figure 4:
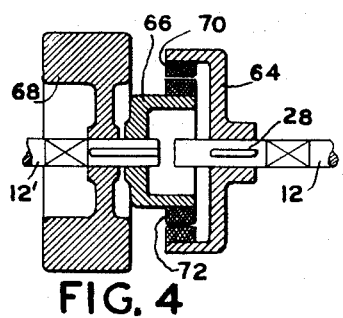

Figure 4 shows yet another embodiment of the invention which is possible wherein output member 64 is rigidly secured to the shaft 12 and an input member 66 is rigidly secured on a shaft 12' to rotate within the output member 64. The means for driving the input member 66 could be an annular rotatable member 68, such as a flywheel, or intermediate means connected to a flywheel. In this embodiment, excitable windings 70 are secured to the inner periphery of the output member 64 and induction windings 72 are secured to the outer peripheries of the input member 66, although it is understood that this arrangement may be reversed.

Figure 5:
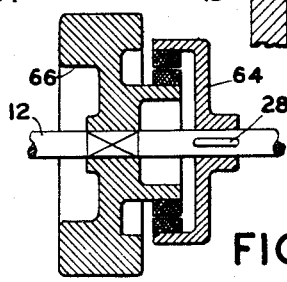

The embodiment of the invention shown in Figure 5 is similar in structure to that of Figure 4 with the exception that on a single shaft 12, input member 66 is idly mounted on shaft 12 within the output member 64 which is keyed to shaft 12.

Figure 6:
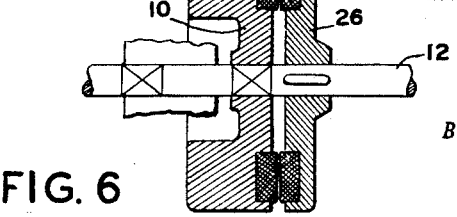
Figure 7:
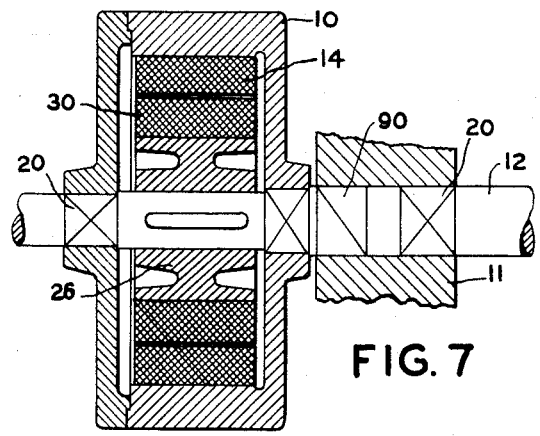
Figure 7 is a schematic sectional view of another preferred embodiment of the invention showing a one-way brake as a means to reference one of the rotatable members to the frame of the apparatus.

Referring now to Figure 6, it will be seen that this embodiment of the apparatus illustrates applicability of the invention in situations other than those involving inner and outer relatively rotating members 10 and 26 as shown in Figures 1 through 5. In Figure 6, the members 10 and 26 have substantially the same radial dimension and are axially facing each other. The input member 10 is formed with an energy accumulating mass or flywheel portion 13 and carries windings 14, facing the co-acting windings 19 on the output member 26. Brake means 48 (which may optionally be a one-way-engaging clutch such as shown in Figure 7) provide a frame-based reference for shaft 12 whenever motoring action has reduced output shaft angular velocity to zero.

Figure 8:
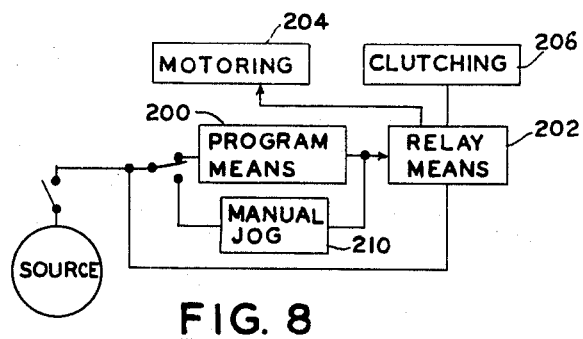
Figure 8 is an electrical schematic diagram indicating control functions for the device shown in Figure 7.

It is foreseeable and contemplated that in certain applications of the invention, rotation of shaft 12 in a negative direction, i.e., the direction opposite to that of the input member 10, may not be required and may even be undesirable. In the arrangement shown in Figure 7, the mechanism is adapted to unidirectional torque output, and this simplification makes possible elimination of the brake 48 in certain applications. In this arrangement, several of the parts may be the same as described and shown in Figures 1 and 2, and have been given the same reference numbers. The input and output rotatable elements 10 and 26 are each suspended for independent rotation with respect to the frame 11 and about the same common axis. The output element 26 is again keyed to the shaft 12, which is used for delivery of output torque. In the form shown, a one-way engaging brake means such as a roller clutch 90 determines that the shaft 12 shall rotate in one and only one direction with respect to the frame 11. Excitation of windings 14 to provide a motoring action is preferably such that the relative torque thereby developed drives the one-way-engaging brake 90 against the frame 11 to permit positive frame reference rotation of the input member 10 to obtain maximum speed whenever the angular velocity of shaft 12 has been reduced to zero. Schematic control means for one-way engaging brake operation of the invention is shown in Figure 8 which is similar to Figure 17, except for the elimination of control connections to any brake. The program means 200 or the jog means 210 serves to actuate the relay means 202 to excite the windings 14 either for motoring action 204 or for clutching action 206, as the case may be. Relay means 202 is intended to perform, in addition to a relay function, such modulating and rectifying action as required for the particular application of the invention.

For one-way brake operation, and starting from rest, windings 14 are excited to provide a motoring action and this motoring action is allowed to develop full or substantially full speed of the input member 10. Relay means 202 is then operated to de-energize windings 14 in their motoring capacity and to re-excite windings 14 to provide clutching action, thus substantially locking the input member 10 to the output member 26 and to shaft 12, and delivering torque to the load as long as windings 14 are excited to provide clutching action. As shown, when one of the means 200 or 210 determines that the clutching action shall cease, relay means 202 is reversed so as to re-energize windings 14 to provide motoring action and to de-energize windings 14 with respect to clutching action. This will have the immediate effect of decelerating the shaft 12 and of re-accelerating the input member 10. Once the shaft speed has been reduced to zero, the one-way-engaging brake 90 derives a solid reference against the solid frame 11, where the continued acceleration of the input member 10 is necessary.

Thus it will be seen that the operation of the embodiments of the invention shown in Figures 3, 4, 5, 6 and 7 are essentially the same as the operation of the embodiment of the invention shown in Figures 1 and 2. In each case, desired torque control is obtained by the selective and modulated application of alternating and direct current energization to the excitable windings of one member, whereby appropriate electromagnetic forces are induced in the induction windings of the other member to provide any desired magnitude of torque and degree of acceleration or deceleration selectively in either of the input or output members.

*Field winding circuitry (Figures 9 through 16)*

Reference will now be made to such figures as specifically illustrate various arrangements of windings carried on the input members 10 to provide the torques explained and to be explained.

Figure 9:
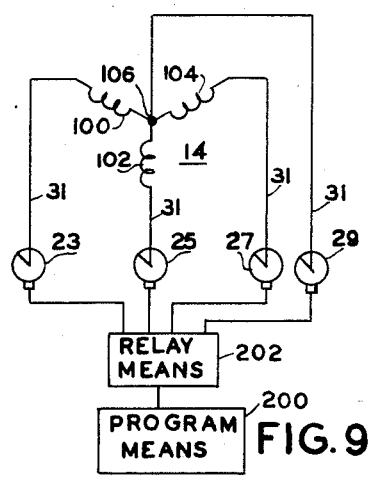
Figure 9 is a schematic wiring diagram of the windings suggested for illustrative purposes in Figure 2.

In the illustrative embodiments of the invention shown in Figures 1 and 2, showing but one form of the invention, direct and alternating currents are impressed on the windings 14 through the collector rings 21, 23, 25, 27 and 29, and the cable 31, by means well understood in the electrical art (see also Figure 9). Program means 200 through relay means 202 supply alternating current to the windings or coils 100, 102, and 104 of windings 14 of the input member 10 through the collector rings 23, 25 and 27. The program means also selectively supply direct current simultaneously to all three coils 100, 102 and 104, and a lead connected between common junction 106 and collector ring 29 serves as a common return.

Figure 10:
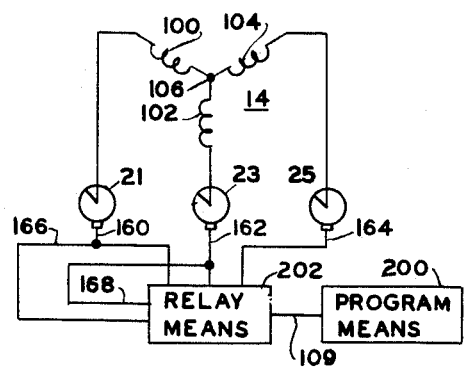
Figure 10 is a schematic wiring diagram of a preferred embodiment of the windings of one of the rotatable members, said windings being similar to the windings shown in Figure 9, but with one less slip ring required.

An embodiment of the invention similar to Figure 9, but with one less slip ring and more simplified windings, is shown in Figure 10. This embodiment is contemplated for use where relatively smaller clutching torques are required and/or where initial cost of equipment is an important or overriding consideration. For A.C. excitation of windings 14, standard motor Y-connected coils 100, 102 and 104 are provided and are connected through leads 160, 162 and 164 to slip rings 21, 23 and 25, respectively, in the usual manner. A source of A.C. and D.C. energization is alternatively supplied to relay means 202 connected through lead 109 to program means 200. The operation of this embodiment of the invention primarily requires nothing more of program means 200 and relay means 202 than switching from one to the other form of energization (A.C. to D.C. and vice versa). With the relay means 202 set for A.C. energization, coils 100, 102, and 104 are Y-connected for motoring or repulsion torque operation. With the relay means 202 set for D.C. energization, two of the three windings, for example windings 100 and 102, are series connected through two of the three slip rings, for example slip rings 21 and 23 and leads 166 and 168 to relay means 202 for clutching or attraction torque operation.

Figure 11:
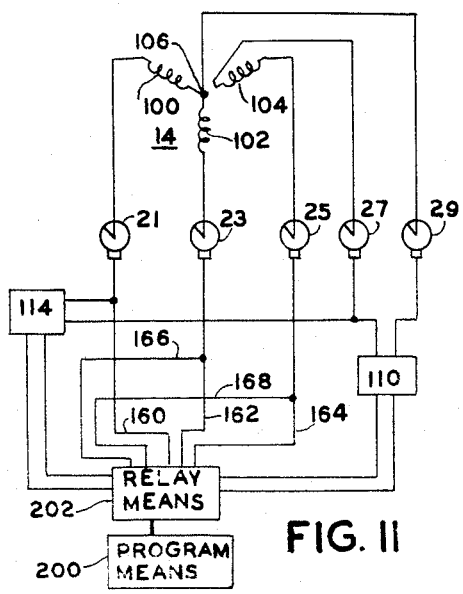
Figure 11 is a schematic wiring diagram showing a preferred embodiment of the windings of one of the rotatable members Y-connected.

Figure 11 shows a schematic layout of another embodiment of the windings 14. Three coils 100, 102, and 104 are Y-connected for alternating current and connected in series for direct current. It will be seen that coils 100 and 102 are connected at a common junction 106 and have their opposite ends connected to slip rings 21 and 23, respectively. Coil 104 has its one end connected to slip ring 25 and its other end connected to slip ring 27. Common junction 106 is connected directly to slip ring 29. For excitation of windings 14 with alternating current, slip rings 21, 23 and 25 are connected to relay means 202 through lines 160, 162 and 164. By connecting between coil 104 and common junction 106, the windings 14 will then be Y-connected. Accordingly, when program means 200 operates relay means 202 to energize coils 100, 102 and 104 for motoring action, a switching means 110, operable responsive to relay means 202 when A.C. energized, connects slip ring 27 to slip ring 29, thereby connecting coil 104 to junction 106. For excitation of windings 14 with direct current, slip rings 23 and 25 are connected to relay means 202 through lines 166 and 168. A second switching means 114, operable responsive to relay means 202 when D.C. energized, is connected between slip rings 21 and 27 to connect coils 100, 102 and 104 in series. This connection will be seen to run from relay means 202 through slip rings 23, coils 107, common junction 106 and coils 100 to slip ring 21. Switching means 114 then completes the circuit from slip ring 21 through slip ring 27, coils 104, and slip ring 25 to relay means 202. Thus, the same coils 100, 102, and 104 are used for both alternating and direct current energization depending upon the energization from relay means 202 and the operation of switching means 110 and 114.

Figure 12:
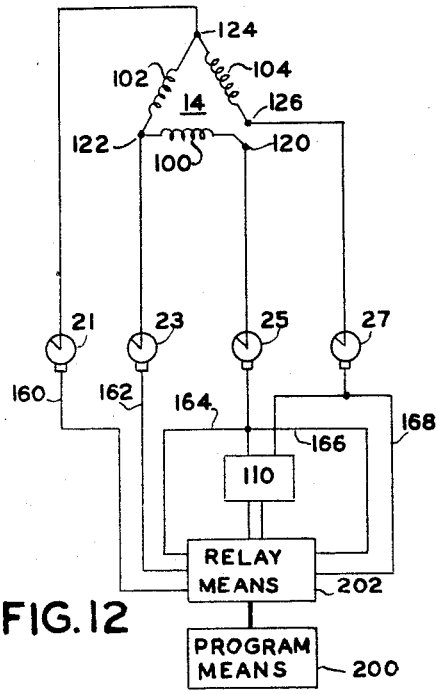
Figure 12 is a schematic wiring diagram showing a preferred embodiment of the windings of one of the rotatable members delta-connected.

In Figure 12 the coils 100, 102 and 104 are shown as delta connected. The relay means 202 is connected to slip rings 21, 23 and 25 by leads 160, 162 and 164 to slip rings 25 and 27 through leads 166 and 168. Slip ring 25 is connected to end 120 of coil 100, slip ring 23 is connected to junction 122 of coils 100 and 102, slip ring 21 is connected to junction 124 of coils 102 and 104, and the other end 126 of coil 104 is connected to slip ring 27. For alternating current energization of the windings, the delta is completed by connecting terminal 120 of coil 100 to terminal 126 of coil 104, and this is done by A.C. switching means 110, operable responsive to relay means 202 when A.C. energized, connecting slip rings 25 and 27. For D.C. energization of the windings, slip rings 25 and 27 are connected to relay means 202 through lines 166 and 168 whereby to place coils 100, 102 and 104 in series. No D.C. switching means is required here, for the windings are normally in series until the A.C. switching means 110 completes a delta hook-up by connecting terminals 120 and 126.

Figure 13:
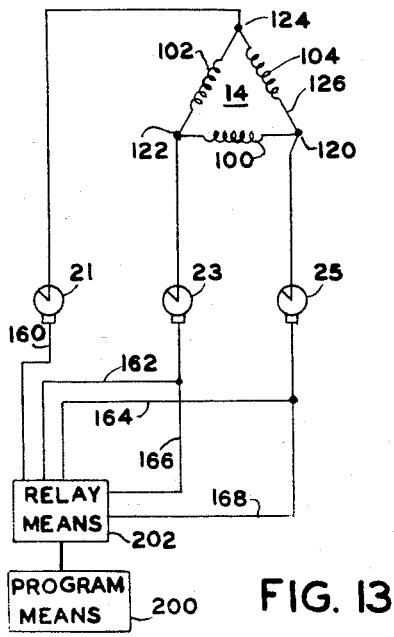
Figure 13 is a schematic wiring diagram showing another preferred embodiment of the windings of one of the rotatable members delta-connected.

The delta connected windings may also be connected in parallel for direct current energization as shown in Figure 13. Here, as in Figure 12, relay means 202 is connected to slip rings 21, 23 and 25 through lines 160, 162 and 164, respectively, for A.C. energization as is well known in the art. Relay means 202 is also connected to slip rings 23 and 25 through lines 166 and 168 for D.C. energization. When relay means 202 is D.C. energized, direct current then flows through slip ring 23 to junction 122 between coils 100 and 102. From junction 122, part of the current then flows through coil 100 to slip ring 25 and back to relay means 202. The remaining portion of the current flows in series through coils 102 and 104 in parallel with coil 100 to slip ring 25 and back to relay means 202 to complete the parallel circuit. With the windings connected in parallel instead of series for clutching, more current will flow through the windings to increase the number of ampere-turns and the resulting magnetic flux for greater clutching capacity.

Figure 14:
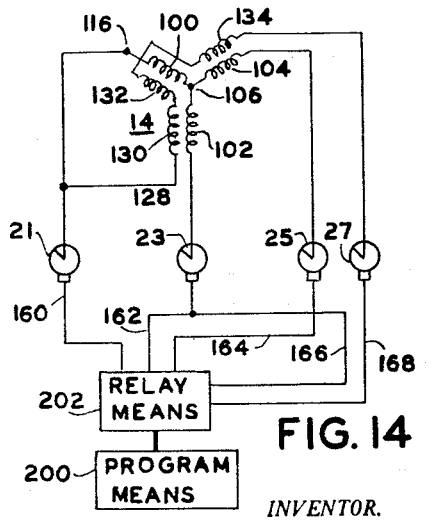
Figure 14 is a schematic wiring diagram showing a preferred embodiment of the windings of one of the rotatable members Y-connected and including auxiliary windings.

Another embodiment of the windings 14 is shown in Figure 14. Coils 100, 102 and 104 are Y-connected at a common junction 106 and have their opposite ends connected to slip rings 21, 23 and 25 respectively, which are in turn connected to relay means 202 through lines 160, 162 and 164. Thus, for alternating current energization the three coils present a normal Y-connected network. For direct current energization, coils 100 and 102 are connected in series with auxiliary coils 130, 132 and 134, and relay means 202 through lines 166 and 168 is connected to slip rings 23 and 27. Direct current will then flow from relay means 202 through slip ring 23, coils 102, common junction 106, and coils 100. End 116 of coils 100 is then connected by lead wire 128 to series connected auxiliary coils 130, 132 and 134. Auxiliary coil 134 is in turn connected to slip ring 27 and from there back to relay means 202. With this grouping, no switching means is required to reconnect the windings when changing from direct to alternating current and vice versa. In addition, the use of auxiliary coils for D.C. excitation greatly increases the number of available turns to allow equal clutching torques with decreased current.

Figure 15:
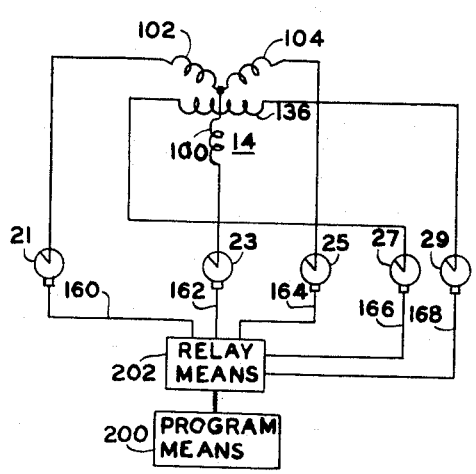
Figure 15 is a schematic wiring diagram of a preferred embodiment of the windings of one of the rotatable members showing separate windings for alternating current and direct current excitation, the alternating current windings being Y-connected.
Figure 16:
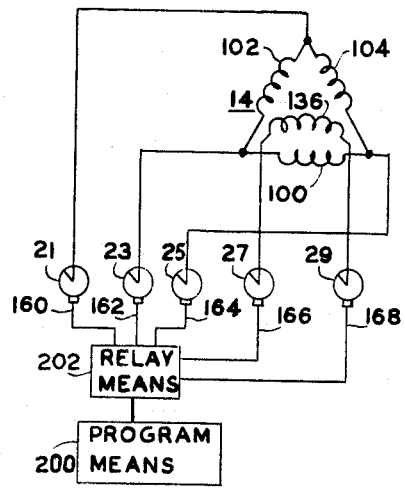
Figure 16 is a schematic wiring diagram of a preferred embodiment of the windings of one of the rotatable members showing separate windings for alternating current and direct current excitation, the alternating current windings being delta connected.

In the groupings shown in Figures 9 through 14, either part or all of the windings are used for both A.C. and D.C. energization. In certain circumstances it is desirable to use separate windings for D.C. and A.C. in order to have the two circuits electrically independent of each other. Two illustrative embodiments which provide separate windings are shown in Figures 15 and 16. In both of those figures, relay means 202 is connected to slip rings 21, 23 and 25 for A.C. energization, and to slip rings 27 and 29 for D.C. energization. Separate D.C. windings 136 are connected to slip rings 27 and 29 to carry only direct current as required for clutching. Regular A.C. coils 100, 102 and 104 may be Y-connected (see Figure 15) or delta connected (see Figure 16) and connected through slip rings 21, 23 and 25 to relay means 202.

*Control circuitry for positive torque transmission*
*(Figures 17 and 18)*

Figure 17:
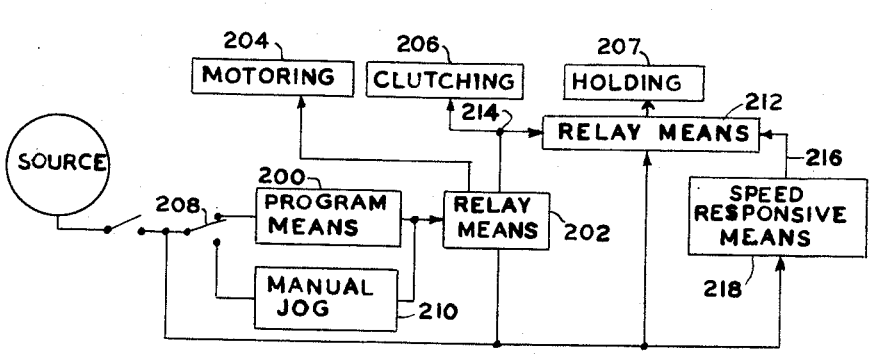
Figure 17 is a simplified electrical diagram schematically indicating the connection of control elements for the structure of Figures 1 and 2.
Figure 18:
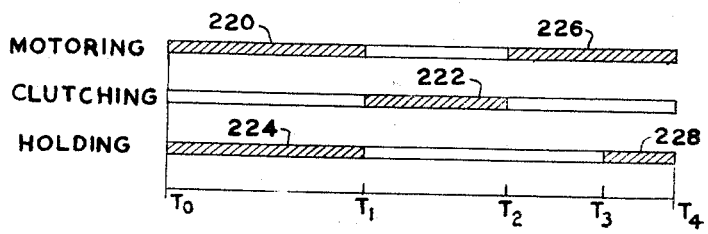
Figure 18 is a graphical diagram depicting relative timing of various elements of the structure of Figures 1 and 2 in a typical cycle of operation.

Control mechanism and a typical cycle of operation is illustrated in Figures 17 and 18, respectively. For automatic operation, reliance may be had upon re-cycling program means 200 and one or more relay means 202, determining excitation of windings 14 for co-action with windings 19 to selectively provide repulsion or attraction torque between input member 10 and output member 26. Windings 14 will be understood to include motoring and clutching elements 204 and 206 whether they be separate windings or merely one winding energized alternately to first provide repulsion torque and then attraction torque. If desired, a selector switch 208 may be actuated to enable a manual-jog control 210 to bypass program means 208. The holding means 207, which may be the mechanical brake 48 shown in Figure 2, is shown actuated through separate relay means 212, having a first control connection 214 functioning from the relay means 202 and a second control connection 216 functioning from speed-responsive means 218. In Figure 2, the speed-responsive means 218 is shown mechanically connected to the output shaft 12 and is preferably so arranged that, when the speed of the shaft 12 approaches zero, the relay 212 is actuated to operate the holding means 207 thereby holding the output shaft 12 against further rotation.

To operate the invention as a self-energizing prime mover or torque transmitter, the holding means 207 is applied to the shaft 12, rendering it non-rotatable. Windings 14 of input member 10 are then excited to provide repulsion torque between input member 10 and output member 26 which produces frame-referenced torque on the input member 10, so as to develop optimum speed of rotation of the input member 10 until such time as output torque is to be delivered by way of shaft 12. This time will be determined either by the program means 200 or by manual-jog control 210, depending upon the manner in which the machine is to operate. Under control of one of the means 200 or 210, relay means 202 is effective to disconnect the holding means 207 and to de-energize the windings 14 functioning to provide repulsion torque between the input and output members 10 and 26 respectively. At the same time, relay means 202 re-energizes the windings 14 to provide attraction torque between these members, thereby substantially locking the input member 10 to the output member 26 and to load connected shaft 12.

These functions are graphically depicted in Figure 18 wherein the shaded bar 220 represents excitation of windings 14 to provide the aforesaid repulsion torque between input and output members 10 and 26, respectively, the shaded bar 222 represents excitation of windings 14 to provide attraction torque between the input and output members, and the shaded bar 224 represents the periods when the holding means 207 is actuated to hold the output shaft 12 non-rotatable.

As aforesaid, energization of windings 14 to provide repulsion torque between the input and output members is otherwise referred to as motoring, whereas energization of the windings 14 to provide attraction torque between these members is otherwise referred to as clutching with respect to the two members. Both the clutching action and the motoring action may selectively be employed to dynamically brake the rotation of the output shaft 12 and such braking is not to be confused with the static braking or holding of the shaft by holding means 207. The means whereby the motoring and clutching function of windings 14 co-acting with windings 19 are utilized to provide dynamic braking on the output shaft 12 will be explained more fully hereinbelow. It will suffice to state at this point of the discussion that either attraction or repulsion torques may be utilized to drive the apparatus, and conversely repulsion or attraction torques may otherwise be utilized to dynamically brake the apparatus. Thus, if the repulsion torques are utilized to drive the apparatus, then the attraction torques will be utilized to dynamically brake the output shaft 12; and if on the other hand the attraction torques are utilized to drive the apparatus, then the repulsion torques will be employed to dynamically brake the output shaft 12. This tends to make the operation of the apparatus universal in that it will function either in a positive direction or a negative direction.

Attraction torque, or clutching action is such as to substantially bind or lock the input and output members 10 and 26 to each other and thus to transfer the flywheel momentum of input member 10 directly to the output shaft 12. The length of time during which such momentum is transferred may be determined by a variety of means, but in the form shown, the program means 200 is sufficiently suggestive of pre-determined or automatically determined transient clutching action. As soon as the clutching period is over, relay 202 is actuated by means 200 or 210 to de-energize the windings 14 in their clutching capacity, and to re-energize the windings for motoring action. This function is suggested by the bar 226 in Figure 18.

As an inherent aftermath of operating the windings 14 to provide clutching action, some of the momentum of the flywheel or input member 10 is lost (i.e., transferred to the load) so that there will be some speed reduction thereof. At the same time, there will have been a development of speed and momentum in the output member 26, meaning, of course, all parts keyed together with the output member, including parts of the load (not shown). Therefore, upon de-energizing the windings 14 which had been functioning in a clutching capacity, the input member will be revolving at less than maximum speed, and the output member 26 will have accelerated to some predetermined speed, less than that of the input member. Re-excitation of windings 14 to provide motoring develops relative torques between the input and output members in the direction to reduce the speed of rotation of the output member and to re-accelerate the input member. Since the effective moment of inertia of the input member preferably is in substantial excess of that of the output member (including that of the effective load), the motoring action of windings 14 is able to reduce to zero (and thus effectively to dynamically brake) the output shaft 12 while at the same time re-accelerating the input member. The speed-responsive means 218 automatically detects the achievement of substantially zero speed and, upon such detection, is effective to cause relay 212 to actuate the holding means 207 thus securing output shaft 12 against further rotation.

In Figure 18 dashed line 228 is intended to suggest that the instant of re-application of holding means 207 is a somewhat indeterminate period, but that it clearly follows the instant at which the clutching action of windings 14 is de-energized and the motoring excitation is re-applied. Once having applied the holding means 207, a firm reference to the frame 11 is re-established and what speed remains to be developed in the input member 10 can be readily regained before the next clutching phase occurs. It is of fundamental importance to obtain the full benefit of the invention that the holding means 207 shall not be applied until such time as maximum utilization is made of the motoring action of windings 14 to accomplish dynamic braking action on the output shaft 12, and at the same time to accomplish a substantial re-acceleration of the input member 10. Otherwise, if the holding means 207 were to be reapplied as soon as the clutching action was de-energized, most of the energy of the output member and load would be dissipated as frictional heat and not restored to the input member.

As already pointed out hereinabove, either the motoring or clutching actions of windings 14 may be utilized to dynamically brake the output shaft 12 or to drive the output shaft 12. If it is desired to bring the input member to rest, it may be braked by energizing the clutching action while the holding means is applied to the output member. Since the effect of clutching action is to reduce the differential speed of the input and output members and the output member is constrained to remain at rest, the clutching action here has the sole effect of slowing down the input member.

It will also be noted that the clutching and motoring actions of windings 14 do not depend upon a particular direction of rotation of input member 10 in order to perform their respective functions. This means that the electric circuitry may include a polarity or field-reversing mechanism, whereby direction of motoring action and input member rotation may be selected. In such a case, a motoring torque in a direction opposite to that previously used may drive the output member in the same direction as would clutching action. Such mechanism is not shown but will be understood as implicit in the type of organization described for the figures.

Because there is no direct connection between the energy source and the load to be driven, all torque being transmitted through the co-acting magnetic fields developed by windings 14 and 19 respectively, it is not possible to transmit more than a predetermined amount of torque from the input member to the output member. This, therefore, enables the invention to serve as an overload protection device. The torque transmitted during energization of windings 14 to provide clutching is a function of the number of turns in the windings 14 and the magnitude of the current conducted through them. Accordingly, it is possible to precisely control the torque by varying the current supplied to the windings. If the load requires a greater torque than the existing magnetic field can transmit, then the locking relationship between the input and output members will no longer be maintained and the output member will begin to slip with respect to the input member at a rate determined by a ratio of the required and transmitted torques. Likewise, when energizing windings 14 to provide motoring action, the strength of the rotating alternating current field determines the motoring torque. Therefore, it will be seen that depending upon the magnitudes of the currents chosen, only a predetermined maximum torque can be exerted on the load, and this may be chosen in such a manner as to limit overload upon the machine. Furthermore, if the momentum of the output train is sufficient of itself to do damage, a negative torque or energy absorbing action may be provided at the critical period to further limit the load being developed.

The clutching action of the invention may be divided into two portions. The first of these is the initial application of direct current and the second is the steady state condition which then follows. If the torque is to be applied to a load which is at rest, before a steady torque can be applied it is necessary to overcome the inertia of the shaft 12 and the output member 26 and to bring them up to a desired speed. Thus, if the torque transmitter can supply initial high torque to the driven members and then return to the predetermined magnitude of torque, a sharp, well-defined initial clutching action may be obtained without experiencing an overload.

The winding 14 on clutching present a highly inductive load to the direct current source which energizes them. Accordingly, the windings present a low initial impedance allowing the inrushing current to exceed the steady state value which is subsequently established. Because, as stated above, the transmitted torque is a function of the current in the windings, the initial torque between the output and input members exceeds the steady state value. However, this excess torque is required to overcome the inertia of the output member and its related parts, so that no excess torque reaches the load. This high initial torque also allows the driven members to reach the desired velocity more quickly than would otherwise be possible since the initial clutching action produces the aforesaid sharp initial clutching or quick lock up between the members which avoids much of the slip found to be present in other types of magnetic and electromagnetic frictionless clutches.

*Control circuitry for negative torque transmission (Figures 19 and 20)*

In the described embodiments set forth hereinabove, emphasis has primarily been placed on positive-torque transmission, that is, for the function in which clutch action develops output torque, and motoring action substantially kills output momentum. Actually, however, and as indicated generally hereinabove, the invention is of broader application, and in particular with respect to the development of negative-torque transmission. In the development of negative output torque, the normal momentum of the input member 10 is based on a motoring speed representing less than "full" (or maximum) motor speed, as automatically governed by speed-limiting means 230 (see Figure 2) referenced to the frame 11 and driven by take-off means from the input rotatable member 10. Negative output torques are developed by over-riding the speed-limiting means 230 and further energizing the motoring action 204 of the windings 14. After delivery of the desired transient negative torque to the load, the motoring action 204 is de-energized and the clutching action 206 of the windings is re-actuated. These functions are set forth in schematic form in Figure 19.

Figure 19:
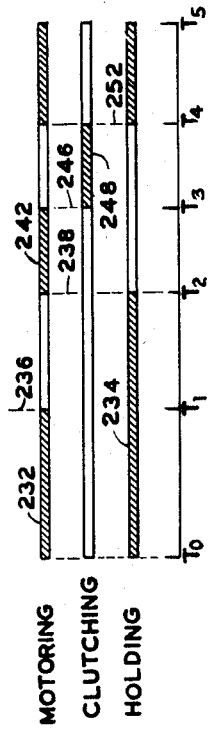
Figure 19 is a schematic diagram similar to Figure 18 and depicting relative timing for another mode of operation of the various forms of the inventions.

Figure 19 illustrates an operative cycle of the torque-transmitting mechanism for the case of negative output torque. As with the positive torque application of the invention already set forth hereinabove, the motoring action 204 is energized and holding means 207 is applied to permit acceleration of the input member 10 to a normal running speed; shaded bars 232 and 234 suggest this starting phase, and cut-off of the motoring action at instant 236 suggests automatic operation of the speed-limiting means 230 when the predetermined running speed has developed in the input member 10. At a subsequent instant of time 238, determined by reverse program means 240 (to be described—see Figure 20), holding means 207 is released, speed limiting means 230 is cut out, and the motoring action 204 is further energized at an excitation level sufficient to react the motoring torque against the input member and thus to develop output shaft rotation in a direction opposite to that of the input member rotation; this phase is illustrated by bar 242 in Figure 19. Output shaft deceleration may be initiated by a retarding torque trip 244 (Figure 20) at an instant 246 determined by the driven machine; this occurs upon deenergizing the motoring action 204 and energizing the clutching action 206, as suggested by the shaded bar 248. At release of the brake trip 250 (Figure 20) which may be displacement-responsive, or zero-speed-responsive means, or both, at instant 252, the clutching action of windings 14 is deenergized, holding means 207 is applied, and the motoring action of windings 14 is restored to control of the speed-limiting means 230.

*Universal operation (Figure 20)*

Figure 20:
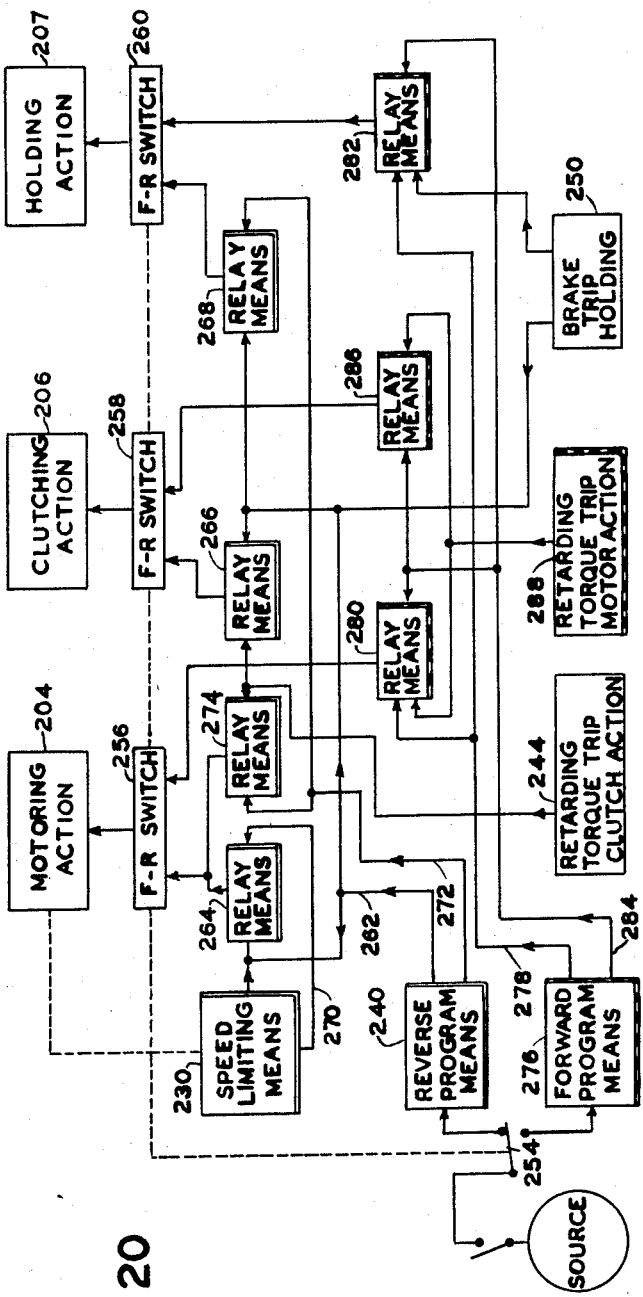
Figure 20 is an electrical diagram similar to Figure 17, but illustrating controls for universal operation of the invention.

Figure 20 illustrates control connections for the motoring, clutching, and braking functions of the apparatus for the various forms of the invention with an indication of the manner in which positive output torque or negative output torque may be selectively available, depending upon the positioning of a selector switch 254. Separate switches 256, 258, and 260 are ganged to the selector switch so as to provide motoring, clutching, and holding selectively for control to develop positive or negative output torque as desired. To simplify the circuit of Figure 20, only control connections have been shown and the power-supply leads to the various relays have been omitted; also, for the sake of simplicity, most of the control elements determining negative-torque development are independently shown from those control elements determining positive-torque development and therefore have been given characteristic shading to simplify a reading of the figure. For further simplicity of interpretation, a convention has been adopted for all relays, whereby control signals applied at the left side of the relay block govern relay actuation, and control signals applied at the right side of the block determine drop out or de-energization of the relay.

A negative-torque development program derives from reverse program means 240 and, when the system is started from rest, a starting signal in line 262 is effective to actuate the motoring action relay means 264, and simultaneously to de-energize the clutching action relay means 266 and to actuate the holding action relay means 268. The relay means 264, 266 and 268 thus determine simultaneous energization of the motor function of windings 14 and the holding means 207, as indicated at 232 and 234 in Figure 19, whereby input momentum may be developed in the input member 10.

For purposes of negative-torque development, it may be important that speed-limiting means 230 driven by the input member 10 shall limit the angular velocity of the input member to less than full speed, as for example, 50% to 80% of full speed. This speed is preferably chosen according to the torque curve of the motoring action, and in some circumstances negative torque may be developed by initiating motoring action with the input member at rest. Connection 270 and speed-limiting means 230 suggests that upon attainment of the limiting speed in input member 10, relay 264 is dropped out, thereby enabling input member 10 to coast while holding means 207 remains set. This function may occur at the instant 236 designated in Figure 19.

In the form shown, program means 240 includes a second output line 272 for handling voltages determining initiation of negative-torque development. At the onset of such voltage, motoring action overdrive relay 274 is actuated so as to excite windings 14 to provide motoring action independent of any regulation by speed-limiting means 230. At the same instant, the same voltage determines drop-out of the brake relay 268 so that motoring action involves delivery of negative output torque through reaction against the flywheel inertia of member 10. This will be accompanied by some small increase in speed of rotation of input member 10 with respect to the frame, but the principal speed development will be through negative torque delivery at the output shaft 12. The duration of negative-torque delivery may be determined by program means 240, but in the form shown, a separate retarding-torque trip 244, which may be a limit switch based on the driven machine, operates at instant 246 (Figure 19) to drop out the motoring action overdrive relay 274 and at the same time to actuate the clutching action relay 266. Clutching action then has the effect of retarding the output shaft and killing its momentum, all by reaction against a reference to the momentum of the input member 10. Upon achievement of zero output-shaft speed or of top-center position on the driven machine, or of some other brake-trip condition, the brake-trip means 250 is effective to drop out the clutching action relay 266 and to reactivate the brake relay 268, thus reapplying the holding means 207 and rendering the motoring action once more under speed-limited control.

The selector switch 254 and associated switches 256, 258 and 260 are thrown to the other position (selecting positive output torque delivery), to render separate forward program means 276 operative. Forward program means 276 corresponds generally to the means 200 of Figure 17. When the system is started from rest, a first output 278 from the program means 276 delivers start-control voltage to simultaneously actuate the motoring action control relays 280 and the brake-control relay 282, thus permitting the development of flywheel momentum with respect to the frame. The delivery of positive torque in the shaft 12 is under the control of the second output 284 from program means 276.

At the onset of a control voltage in line 284, the motor control relay 280 and the brake relay 282 are dropped out, and the clutch control relay 286 is actuated. Clutch action serves to deliver output-shaft rotation in the same direction as rotation of the flywheel member 10, and in the process of transferring kinetic energy from the flywheel member 10 to the output, there is some speed reduction in the flywheel member 10. Termination of positive torque delivery may be determined by a retarding torque trip 288 analogous to that described 244 for the case of negative-torque development, except that the output of trip 288 determines drop-out of clutch relay 286 and actuation of the motor-control relay 280. This permits the motoring action 204 to develop retarding torque for decelerating the output shaft while also restoring kinetic energy to the input member 10. Upon attainment of zero output speed, top-center position, or some other condition of the driven machine, the brake trip 250 may be effective to actuate brake relay 282, so that the holding means 207 may hold the output shaft and provide a frame reference against which continued motoring action can serve to fully restore the flywheel member 10 to the desired running speed with respect to the frame.

For simplicity and clarity of exposition, discussion of the invention set forth hereinabove has referred in the alternative to excitation of windings 14 either for motoring action or for clutching action, because it is believed that a clearer understanding results from a separate consideration of the functions of these parts. However, it will be appreciated that, under certain circumstances, it will be desirable to provide "simultaneous" or "overlapping" excitation of windings 14. In such case, separate windings such as suggested in Figures 15 and 16 will be provided on the input member for both motoring action and clutching action, and excitation of the motoring and clutching elements is preferably variably controllable rather than excitation of windings 14 in the alternative to provide motoring action exclusively, or clutching action exclusively.

With separate motoring and clutching windings on the input member, transfer from predominantly motoring excitation (braking, for positive-torque development; clutching, for negative-torque development) to predominately clutch control (clutching, for positive-torque development; braking, for negative-torque development) of the output shaft 12 may be on a "tightly controlled" faster-response basis. With the employment of separate motoring and clutching windings on the output 10, the terms "excitation," "energizing," "de-energizing," and the like, herein will thus be understood to be relative terms, meaning that the torque developed upon excitation of one winding of input member 10 (e.g. motoring or clutching) shall predominate over the torque developed upon excitation of another winding (e.g. clutching or motoring). Control means 200, 210, 240 and 276 and the various relay means in Figures 17 and 20 will be understood to sufficiently designate control means for effective output-torque development through simultaneous excitation of the windings on the input member 10 to provide motoring and clutching action, by determining which of these windings shall develop the predominate torque at any one time. In this manner, full control, from full speed forward down to slow speed forward, stop, and reverse is available depending upon the sequencing and relative magnitude of the motor or clutch torques caused to predominate.

*Summary*

It is important to comment in summation that the apparatus described hereinabove utilizes components which are readily available and which achieve efficiencies hitherto unobtainable, largely because previous flywheel-clutch-brake combinations have had to rely on the brake (with reference to the frame) in order to kill output momentum, thus dissipating in frictional heat an important fraction of the energy of the system, which cannot be again utilized. For positive output-torque development, the motoring action of the apparatus is utilized to kill the output momentum and at the same time restore momentum to the input member; and for negative output-torque development the clutch elements of the invention serve to kill the output momentum and at the same time restore the flywheel back to its desired running momentum. In both cases, there is inherent avoidance of energy losses occasioned by needless reference to the frame. In actual use, for positive output torque development, it is frequently not necessary to excite windings 14 for motoring action for more than a time sufficient to restore the desired speed to the input member 10. This length of time may be less than a small fraction of a full operating cycle of the machine which is driven by the invention, so that speed-responsive means 230 following the speed of the input member 10 may, if desired, automatically cut-off the excitation of windings 14 for motoring action.

Viewed simply as a torque-transmitting device for a positive-output torque development, the construction of the invention need utilize the motoring action of windings 14 primarily only as a brake, i.e., to kill the output momentum. In such case, as aforesaid, belt-drive grooves 42 (which may be part of the input member 10 for any one of the forms shown) may be viewed as means whereby input member 10 may be continuously driven from an external source of torque such as a continuously running small electric motor. Output torque at shaft 12 is then available upon actuating the windings 14 for clutching action, and the output momentum is killed upon exciting windings 14 to provide motoring action. Once the output momentum is killed, there may be no need for further excitation of windings 14 to provide motoring action, so that the windings thereafter may be deenergized, and prime reliance may be had on the external source of torque to restore to the input member what little if any additional momentum is required.

In like manner, when viewed as a torque-transmitting device for negative output-torque development, one embodiment of the invention need utilize the motoring action of windings 14 primarily and only for efficient delivery of output torque. Again the belt drive grooves 42 are the means whereby the input member 10 may be connected to an external source of torque, such as the continuously running small electric motor 46, referred to hereinabove. Preferably, this continuous running speed represents for input member 10 (with respect to the frame) something less than full speed for motoring action.

As continued usage of negative torques necessarily tends to speed up the input member relative to the frame, the belt-connected motor may be speeded up beyond its running speed. In this situation the motor then functions as a brake on the input member and tends to prevent the input member from reaching maximum speed with respect to the output members, in which case the belt-connected motor increases the effective moment of inertia of the input member to allow greater and longer lasting negative torques than would otherwise be possible.

It will also be noted that as distinguished from an ordinary electric-motor drive wherein starting torque is relatively unfavorable at zero speed, the continuously running input member 10 with its high moment of inertia provides a substantial inertia-referenced base against which relatively high initial torques may react for delivery at shaft 12. Favorable initial positive torque is available because the windings 14 are already moving at relatively high speed when energized for clutching action. Because of the high moment of inertia of the input member, this initial favorable torque characteristic applies also when actuating the apparatus for negative torque delivery, as discussed in connection with program means 240 of Figure 20 and also Figure 19.

It is to be understood that while several embodiments of the invention are shown herein, these embodiments are by way of example only and are not to be construed in a limiting sense. It is an outstanding advantage of the invention that modulated applications of positive and negative torque may be and are repeated in a cycle or sequence of operation as for starting, slow-down, load control, restriking, synchronizing and motoring. Still other similar arrangements and modifications may be resorted to without departing from the scope of the invention, which is intended to be limited only by the appended claims.

I claim:

1. A prime mover comprising: a pair of members rotatable about a common axis, separate motor and clutch windings on one member, induction winding means on the other member and coacting with both said motor and clutch windings, and means to selectively predominately excite said motor and clutch windings, whereby repulsion and attraction torques are selectively developed between said members.

2. A prime mover comprising: a pair of members rotatable about a common axis, a first of said members having separate motor and clutch windings, the second of said members including a winding adapted to co-act with said motor and clutch windings; one of said members having a moment of inertia substantially exceeding the moment of inertia of the other of said members, said other member being adapted for connection to a load, whereby when connected to a load and upon excitation of said motor windings said one of said members will be accelerated reactively against the load to develop flywheel momentum in said one member; and means thereafter to selectively and predominately excite said motor windings and said clutch windings, one with respect to the other, whereby positive and negative torques referenced to instantaneous flywheel momentum may be transferred to said load.

3. An electromagnetic coupling comprising: a pair of members rotatable about a common axis, one of said members having a substantially greater moment of inertia than the other of said members; excitable windings carried by one of said members; induction windings carried by the other of said members; means to Y-connect said excitable windings for excitation by alternating-current; and means to series connect said excitable windings for excitation with direct current, whereby selective motoring action or clutching action is achieved between said members depending upon whether said windings are excited by said first-mentioned means or by said second-mentioned means.

4. An electromagnetic coupling comprising: a pair of members rotatable about a common axis, one of said members having a substantially greater moment of inertia than the other of said members; excitable windings carried by one of said members; induction windings carried by the other of said members; means to Y-connect said excitable windings for excitation by alternating current; and means to parallelly connect said excitable windings for excitation with direct current, whereby selective motoring action or clutching action is achieved between said members depending upon whether said windings are excited by said first-mentioned means or by said second-mentioned means.

5. An electromagnetic coupling comprising: a pair of members each rotatable about a common axis, one of said members having a substantially greater moment of inertia than the other of said members; excitable windings carried by one of said members; induction windings carried by the other of said members; means to delta-connect said excitable windings for excitation with alternating-current; and means to series-connect said excitable windings for excitation with direct current, whereby selective motoring or clutching action is achieved between said members depending upon whether said windings are excited by said first-mentioned means or by said second-mentioned means.

6. An electromagnetic coupling comprising: a pair of members each rotatable about a common axis, one of said members having a substantially greater moment of inertia than the other of said members; excitable windings carried by one of said members; induction windings carried by the other of said members; means to delta-connect said excitable windings for excitation with alternating current; and means to parallelly connect at least two of said delta windings for excitation with direct current, whereby selective motoring or clutching action is achieved between said members depending upon whether said members are excited by said first-mentioned means or by said second-mentioned means.

7. In an electromagnetic torque transmitting mechanism having a pair of members each rotatable about a common axis, one of said members having a high moment of inertia with respect to the other of said members, and co-acting windings carried by said members, the method of operation comprising the steps of holding said other member against rotation in at least one direction; exciting said windings with a torque reacting on said other member in said one direction to produce motoring action between said members, whereby angular momentum is developed in said one member to the exclusion of said other member; thereafter simultaneously applying motoring and clutching excitation to said windings; and selectively varying the intensity of the respective excitations so that either the motoring or clutching action may be caused to dominate the other action, whereby instant response may be obtained to accelerate or decelerate said members.

8. In an electromagnetic torque transmitting mechanism having a pair of members each rotatable about a common axis in a frame, one of said members having a high moment of inertia with respect to the other of said members, and co-acting windings carried by said members, the method of operation comprising the steps of accelerating said one of said members relatively to said frame until a predetermined velocity has been obtained relatively to said frame; thereafter simultaneously applying motoring and clutching excitation to said windings to develop oppositely poled torques between said members; and thereafter selectively adjusting said torques so that one of said torques predominates over the other of said torques, whereby a highly sensitive response is obtained with respect to the co-action of said members.

9. In an electromagnetic torque transmitting mechanism having a pair of members each rotatable about a common axis in a frame, one of said members having a high moment of inertia with respect to the other of said members, and co-acting windings carried by said members, the method of operation comprising the steps of holding said other member against rotation; exciting said windings to produce motoring action between said members; removing the motoring action excitation from said windings; rendering said other member rotatable; and thereafter exciting said windings to produce clutching action between said members, whereby positive output torque is developed in said other member.

10. The method set forth in claim 9, and including the subsequent step of removing the clutching excitation and reapplying the motoring excitation.

11. The method set forth in claim 10 including the step of selectively holding the said other member against rotation when the motoring action between said members has decelerated said other member to substantially zero speed.

12. In an electromagnetic torque-transmitting mechanism having a pair of members each rotatable about a common axis in a frame, one of said members having a high moment of inertia with respect to the other of said members, and co-acting electric windings carried by said members, the method of intermittent operation comprising the steps of holding said other member against rotation relative to said frame; motor-exciting said windings to produce rotation of said one member with respect to the frame; releasing said other member for rotation relative to said frame at a time when the speed of said one member relative to the frame is less than the full possible motoring relative speed of said members; and thereafter selectively further motor-exciting said windings in the same direction for higher motoring relative speed of said members; whereby by reaction against the stored rotational energy in said one member, said other member is caused to rotate with respect to said frame in a direction opposite to that of said one member with respect to said frame.

13. In an electromagnetic torque transmitting mechanism having a pair of members each rotatable about a common axis in a frame, one of said members having a high moment of inertia with respect to the other of said members, and co-acting windings carried by said members, the method of operation comprising the steps of holding said other member against rotation relative to said frame; exciting said windings to produce motoring action between said members; rendering said other member rotatable relatively to said frame at a time when the speed of said one member relative to the frame is less than the full possible motoring speed between said members; thereafter selectively regulating the motoring excitation of said windings whereby said other member is caused to rotate in a direction opposite to said one of said members; removing the motoring excitation from said windings; and exciting said windings to produce clutching action between said members, whereby the velocities of said members will be decelerated.

14. In an electromagnetic torque transmitting mechanism having a pair of members each rotatable about a common axis in a frame, one of said members having a high moment of inertia with respect to the other of said members, and co-acting windings carried by said members, the method of operation comprising the steps of accelerating said one of said members relatively to said frame until a predetermined velocity has been obtained relatively to said frame, and thereafter selectively and sequentially applying motoring and clutching excitation to said windings to sequentially develop oppositely poled torques between said members, whereby said other member may be rapidly accelerated and decelerated relatively to the frame due to the stored rotational energy in said one member and due to the substantial difference in moments of inertia of said members.

15. The method of operation of an electromagnetic torque-transmitting mechanism as set forth in claim 13, including the step of selectively holding the said other member against rotation when the clutching action between said members has decelerated said other member to substantially zero speed.

16. A prime mover comprising: a frame; a pair of members rotatable about a common axis on said frame, one of said members having a substantially greater moment of inertia than the other of said members, electric motor and clutch winding means coacting between said members, whereby upon motor and clutch excitation of said winding means, oppositely poled torques may be developed between said members; means for sequentially applying first clutch excitation and then motor excitation to said winding means; brake means co-acting between said other member and said frame; speed-responsive means responsive to a predetermined relatively slow speed of said other member with respect to said frame; and a control connection between said speed-responsive means and said brake means, whereby upon motor excitation of said winding means and upon discontinued clutch excitation thereof, the motor action of said winding means may substantially reduce rotational speed of said other member relatively to said frame, so that, when said speed-responsive means thereafter detects substantially reduced speed of said other member, said brake may be automatically applied to hold said other member against rotation and thus permit one member to be driven at full speed relative to said frame in order to condition said prime mover for recycled operation.

17. A prime mover comprising: a frame; a pair of members rotatable on a common axis on said frame, one of said members having a substantially greater moment of inertia than the other of said members, electric motor and clutch winding means coacting between said members, whereby upon motor and clutch excitation of said winding means oppositely poled torques may be developed between said members; means including a speed-limiting device for initially rotating said one member relative to said frame at a speed less than the full motoring relative speed of said members; means for sequentially applying first motor excitation and then clutch excitation to said winding means; brake means co-acting between said other member and said frame; speed-responsive means responsive to a predetermined relatively slow speed of said other member with respect to said frame; and a control-connection from said speed-responsive means to said brake means and to the clutch-excitation connection to said winding means; whereby, upon clutch excitation of said winding means and upon discontinued motor excitation thereof, the clutch action of said winding means may substantially reduce rotational speed of said other member relatively to said frame, so that, when said speed-responsive means thereafter detects substantially reduced speed of said other member, clutch excitation may be discontinued and said brake may be automatically applied to hold said other member against rotation and thus to permit the speed of said one member relatively to said frame again to be controlled by said speed-limiting device, thus conditioning said prime mover for re-cycled operation.

18. A prime mover comprising: a non-rotatable member; a pair of members rotatable about a common axis, one of said rotatable members having a moment of inertia substantially exceeding that of the other of said rotatable members; brake means to selectively brake the other of said rotatable members to said non-rotatable member; electric motor and clutch winding means coacting between said rotatable members; first control means to concurrently motor-excite said winding means and to actuate said brake means, whereby rotational energy is accumulated in said one rotatable member; and second control means operative to de-activate said first control means and to clutch-excite said winding means.

19. A prime mover comprising: a non-rotatable member; two members independently rotatable about a common axis, one of said rotatable members having a moment of inertia substantially exceeding that of the other of said rotatable members; brake means to selectively brake the other of said rotatable members to said non-rotatable member; electric motor and clutch winding means coacting between said rotatable members; means to initially rotate said one rotatable member and thus to develop reference angular momentum in said one rotatable member; first control means to clutch-excite said winding means; and second control means to deactivate said first control means and to motor-excite said winding means, said second control means including a speed-responsive device responsive to substantially zero speed of said other rotatable member to actuate said brake means, whereby continued motor-excitation of said winding means may restore angular momentum to said one rotatable member.

20. A torque-transmitting device comprising: a pair of members each rotatable about a common axis, one of said members having a substantially greater moment of inertia than the other of said members; a non-rotatable member, means to selectively brake said other member to said non-rotatable member, co-acting motor windings carried by said rotatable members; first control means to motor-excite said windings while said other rotatable member is braked to said non-rotatable member, whereby rotational energy is imparted to and stored in said one rotatable member, speed-limiting means responsive to achievement of a given rotational speed of said one rotatable member to de-activate said brake means, said given speed being less than the full achievable motor-excited relative speed of said rotatable members, and second control means to further motor-excite said windings after de-activation of said brake means, whereby rotation of said other rotatable member is thereafter governed by said further motor-excitation, referenced to the stored rotational energy of said one rotatable member.

21. An electromagnetic torque transmitter comprising: a pair of members each rotatable about a common axis, one of said members having a moment of inertia substantially exceeding that of the other of said members; a non-rotatable member; brake means to selectively brake one of said rotatable members to said non-rotatable member; electric motor and clutch winding means coacting between said rotatable members; first control means to concurrently motor-excite said winding means and actuate said brake means, whereby rotational energy is accumulated in said one member, said first control means including speed-limiting means responsive to the speed of said one rotatable member and de-activating said brake means at a speed of said one rotatable member representing something less than full relative rotational motor-driven speed of said rotatable members; and second control means operative first to de-activate said first control means and to further motor-excite said winding means, and second to clutch-excite said winding means.

22. A prime mover comprising: a non-rotatable member; two members independently rotatable about a common axis, one of said rotatable members having a moment of inertia substantially exceeding that of the other of said rotatable members; brake means to selectively brake the other of said rotatable members to said non-rotatable member; electric motor and clutch winding means co-acting between said rotatable members; means to initially rotate said one rotatable member and thus to develop reference angular momentum in said one rotatable member, the speed of said one rotatable member being something less than full relative rotational motor-driven speed of said rotatable members; first control means to motor-excite said winding means; and second control means to deactivate said first control means and to clutch-excite said winding means, said second control means including a speed-responsive device responsive to substantially zero speed of said other rotatable member to actuate said brake means.

23. An electromagnetic coupling comprising: a pair of members independently rotatable about a common axis, one of said members having a substantially greater moment of inertia than the other of said members; excitable windings carried by one of said members; induction windings carried by the other of said members; means to Y-connect said excitable windings for excitation by alternating-current; and means to connect at least one of said excitable windings for excitation with direct current; whereby selective motoring action or clutching action is achieved between said members depending on whether said windings are excited by said first-mentioned means or by said second-mentioned means.

24. An electromagnetic coupling comprising: a pair of members each rotatable about a common axis, one of said members having a substantially greater moment of inertia than the other of said members; excitable windings carried by one of said members; induction windings carried by the other of said members; means to delta-connect said excitable windings for excitation with alternating-current; and means to connect at least one of said excitable windings for excitation with direct current; whereby selective motoring action or clutching action is achieved between said members depending on whether said windings are excited by said first-mentioned means or by said second-mentioned means.

25. A prime mover comprising: a pair of members rotatable about a common axis, one of said members having substantially greater moment of inertia than the other of said members; electric motor and clutch winding means coacting between said members; whereby motor-excitation and clutch-excitation of said winding means respectively develop oppositely poled torques between said members; and means for simultaneously motor-exciting and clutch-exciting said winding means, said last-defined means including means for selectively controlling the relative magnitude of said motor and clutch excitations, whereby the direction of torque change in said other member may be selectively controlled.

26. A prime mover comprising: a pair of members each rotatable about a common axis, one of said members having substantially greater moment of inertia than the other of said members; excitable windings carried by one of said members; electric motor and clutch winding means coacting between said members; means for motor-exciting said winding means in alternation with clutch-excitation of said winding means; and means for simultaneously motor-exciting and clutch-exciting said winding means, said last-defined means including means for selectively controlling the relative magnitude of motor-excitation and clutch-excitation of said winding means, whereby the electromagnetic co-action between said members may be selectively controlled.

27. A prime mover comprising: an output member and an input member, said members being rotatable about a common axis, and said input member having a moment of inertia substantially exceeding the moment of inertia of said output member; motor and clutch winding elements carried on one of said members; inducting winding means coacting with said winding elements and carried on the other of said members; means for initially rotating said input member; first control means to excite said motor elements; second control means to excite said clutch elements; and selectively operable means connected to said control means for alternated operation of said first and second control means during rotation of said input member.

28. The improvement in torque-transmitting means comprising: a pair of members each rotatable about a common axis, one to the exclusion of the other of said members having an energy-accumulating mass; means for initially rotating said one member; co-acting winding means carried by said members and adapted to develop oppositely poled torques between said members for first and second excitations of said winding means; and control means connected to said winding means for selectively and successively exciting said winding means with said first and second excitations during rotation of said one member.

References Cited in the file of this patent

UNITED STATES PATENTS

| | | |
|---|---|---|
| 1,179,779 | Uhl | Apr. 18, 1916 |
| 2,246,372 | Lockwood | June 17, 1941 |
| 2,806,967 | Eck | Sept. 17, 1957 |

FOREIGN PATENTS

| | | |
|---|---|---|
| 20,513 | Great Britain | of 1896 |
| 541,976 | Great Britain | Dec. 19, 1941 |
| 616,656 | France | Oct. 30, 1926 |
| 1,030,511 | France | Mar. 11, 1953 |

UNITED STATES PATENT OFFICE
CERTIFICATE OF CORRECTION

Patent No. 2,931,928            April 5, 1960

Frank P. Fehn, Sr.

It is hereby certified that error appears in the printed specification of the above numbered patent requiring correction and that the said Letters Patent should read as corrected below.

Column 1, line 58, for "wheel" read -- flywheel --; column 5, line 67, for "and", second occurrence, read -- of --; column 10, line 20, for "mmeber" read -- member --; column 12, line 52, for "winding" read -- windings --.

Signed and sealed this 6th day of December 1960.

(SEAL)
Attest:

KARL H. AXLINE
Attesting Officer

ROBERT C. WATSON
Commissioner of Patents